(No Model.)
G. M. BEARD.
BICYCLE CRANK SHAFT.
No. 602,049. Patented Apr. 12, 1898.
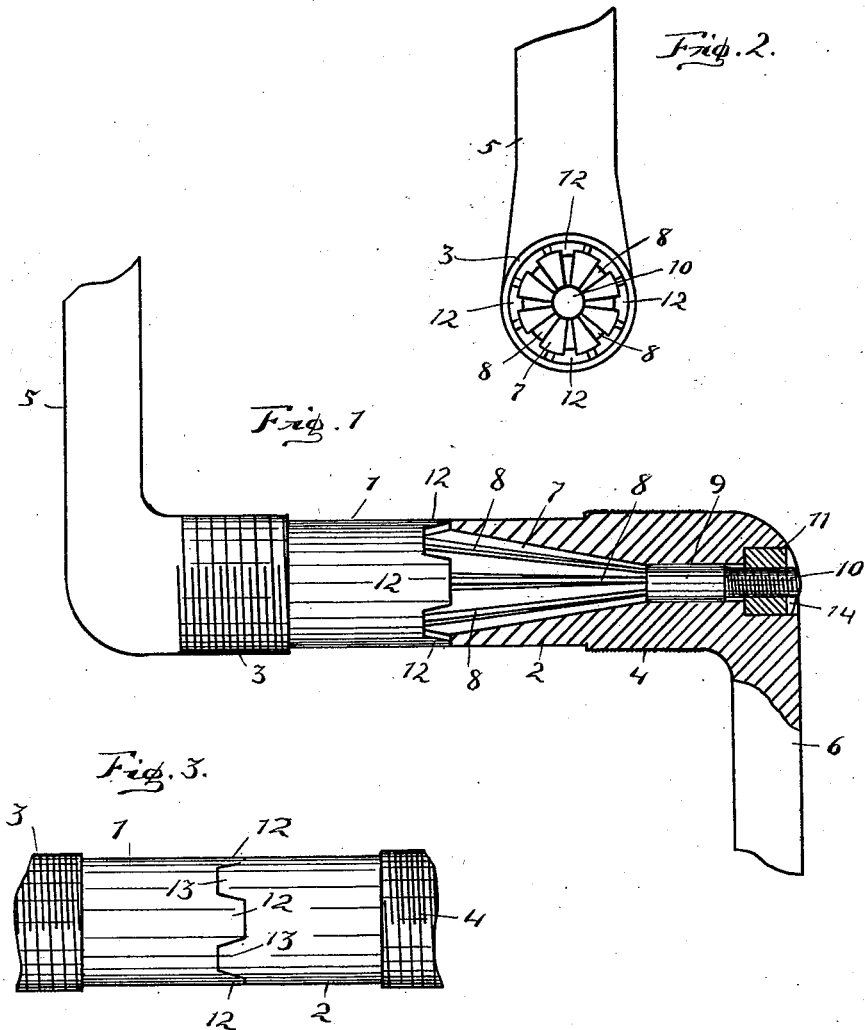
WITNESSES:
Walter G. Burns
James H. Power
George M. Beard INVENTOR
BY Chapin & Denny
his ATTORNEYS.

UNITED STATES PATENT OFFICE.

GEORGE M. BEARD, OF ANGOLA, INDIANA.

BICYCLE CRANK-SHAFT.

SPECIFICATION forming part of Letters Patent No. 602,049, dated April 12, 1898.

Application filed November 2, 1895. Serial No. 567,677. (No model.)

*To all whom it may concern:*

Be it known that I, GEORGE M. BEARD, a citizen of the United States, residing at Angola, in the county of Steuben, in the State of Indiana, have invented certain new and useful Improvements in Bicycle Crank-Shafts; and I do hereby declare that the following is a full, clear, and exact description of the invention, which will enable others skilled in the art to which it appertains to make and use the same, reference being had to the accompanying drawings, which form part of this specification.

My invention relates to improvements in crank-shafts for bicycles and other velocipedes in which there is a shaft and a power-transmitting device so associated therewith that one operates the other.

The objects of my improvement are to provide a crank-shaft that is cheaply made, having but few parts, which can be readily adjusted and not liable to get out of repair and which can be readily removed for examination and repairs without removing the power-transmitting device, and that combines strength with lightness of material. I attain these objects by the mechanism illustrated in the accompanying drawings, in which—

Figure 1 is a side view of the crank-shaft, with a partly-vertical sectional central view. Fig. 2 is an end view of one of the parts of the shaft, showing the conjunction of the parts; and Fig. 3 is a view of the shaft with the screw-threaded ends for the cone-bearings of the hub and an exterior view of the two parts at the point of union.

Similar figures refer to similar parts throughout the several views.

The crank-shaft consists of two parts fastened together by a screw-threaded nut.

The numeral 1 is a cylindrical metal shaft integrally united with the pedal crank-arm 5 and externally threaded at 3 for receiving the usual screw-threaded collar for the cone-bearings that support the hub. The shaft from the inner side of the thread 3 is shown slightly smaller to prevent friction from contact with the hub-box.

The shaft 1 has at its inner part a series of recesses cut into its exterior surface, leaving alternate notches 12, adapted to engage corresponding recesses and the notches 13 in the opposite part, as hereinafter described. From the base of these notches the shaft has at its inner extremity a reduced tapering extension, forming the spindle 7 and terminating with a screw-threaded end 10, adapted to receive a nut 11. The spindle has a series of corrugations or grooves 8 and 8 in its surface, (shown more clearly in Fig. 2,) which are adapted to engage in a corresponding series of notches in the opposite part, as hereinafter described. The opposite part has a shaft 2 with an integral pedal crank-arm 6 and an interior tubular opening through its entire length adapted to closely receive the spindle 7. It has also notches (not shown in the drawings) on the interior wall of the opening adapted to enter the grooves 8 8 and notches 13, with alternate recesses to engage with the recesses and notches 12 in the opposite part, so as to cause the two parts when united to interlock and thereby prevent an independent rotating movement of the parts upon each other, as can be clearly seen in Fig. 3.

The outer end of the shaft 2 is countersunk to admit the screw-threaded nut 11, which is adapted to engage the screw-threaded end 10 of the spindle 7.

14 is a nick in the nut 11 to turn it by a screw-driver.

4 is a screw-thread cut upon the shaft corresponding to the thread 3 upon the other part and adapted for mounting thereon a cone-bearing collar to support the hub-box.

Fig. 2 shows the end view of shaft 1, in which 10 is the end of the spindle 7, 8 and 8 the grooves cut in its surface, 12 and 12 the ends of the notches, and 3 the screw-threaded part for the collar-bearing cones.

The notches 12 and 13 and grooves 8 and 8 may be of any number, but should be of uniform dimensions, so that the opposite parts may be adjustable for placing the cranks at any angle with each other.

While the drawings illustrate the invention with the grooves 8 and 8 in the spindle 7, they are not essential, as the spindle may be smooth and cylindrical or polygonal and the tubular opening the same and be effective for the purpose intended.

The mode of using my device is as follows: Having mounted the collars for the cone-bearings upon the parts, the shafts are inserted into the hub-box and, the spindle 7 entering in the tubular opening of the part 2, the interlocking notches 12 and 13 are engaged and the nut 11 is screwed upon the threaded end 10, by which the two parts are securely and rigidly united. The collars can be adjusted to support the hub by turning them on the shaft as desired. It is obvious that when the two parts are so united there can be no rotating of the parts on each other and that the crank-arms can be adjusted at any angle with each other by simply loosening the nut 11 and disengaging the parts and readjusting them and then securing them together by tightening the nut.

One of the manifest advantages of this construction is that the two parts of the crank may be separated and removed by disengaging the nut 11 without in the least disturbing either the power-transmitting device or the bearings.

Having thus described my invention, what I claim as new, and desire to secure by Letters Patent, is—

1. The combination of a two-part bicycle crank-shaft, one part having a cylindrical axle-shaft with notches 12 and alternate recesses upon its inner end, and tapering spindle extension with a screw-threaded end as shown, and adapted to receive a nut thereon, and the other part having a tapering longitudinal tubular opening, and notches 13 at its inner end adapted to receive the spindle end of the opposite part as shown, and the two parts to be rigidly secured together by means of a nut 11 engaged upon the screw-threaded end of the spindle, all substantially as shown and described and for the purpose stated.

2. The combination of a two-part bicycle crank-shaft and axle, one part having a cylindrical axle-shaft with notches 12 cut in the surface of the inner end with alternate recesses and a tapering spindle extension 7 having one or more grooves 8 therein and a screw-threaded end 10, adapted to receive the nut 11, and the other part having a tubular interior longitudinal opening with notches on its inner walls adapted to engage the grooves 8 in the spindle 7 and having also notches 13 at its inner end adapted to engage the recesses between the notches upon the opposite part, and the two parts secured together by the nut 11 upon the screw-threaded end 10 as shown and described and for the purpose stated.

3. A two-part telescopic crank-shaft, one of said parts being tubular and adapted to receive a portion of the other part, flattened surfaces upon the entering part, lugs upon the end of the receiving part, and a locking device entering the tubular or receiving part and engaging the entering portion of the other part, substantially as described.

Signed by me at Angola, Indiana, this 28th day of October, 1895.

GEORGE M. BEARD.

Witnesses:
EMMET A. BRATTON,
CHARLES A. YOTTER.